(12) United States Patent
Kim et al.

(10) Patent No.: US 11,735,344 B2
(45) Date of Patent: Aug. 22, 2023

(54) MOVING COIL TYPE ACTUATOR (71) Applicant: HYOSUNG HEAVY INDUSTRIES CORPORATION, Seoul (KR)

(72) Inventors: Do Jin Kim, Changwon-si (KR); Seung Ki Kim, Seoul (KR); Sung Ho Lee, Changwon-si (KR)

(73) Assignee: HYOSUNG HEAVY INDUSTRIES CORPORATION, Seoul (KR)

(*) Notice: Subject to any disclaimer, the term of this patent is extended or adjusted under 35 U.S.C. 154(b) by 115 days.

(21) Appl. No.: 17/420,051

(22) PCT Filed: Dec. 30, 2019

(86) PCT No.: PCT/KR2019/018747
§ 371 (c)(1),
(2) Date: Jun. 30, 2021

(87) PCT Pub. No.: WO2020/141839
PCT Pub. Date: Jul. 9, 2020

(65) Prior Publication Data
US 2022/0093304 A1 Mar. 24, 2022

(30) Foreign Application Priority Data
Jan. 2, 2019 (KR) .................. 10-2019-0000119

(51) Int. Cl.
*H01F 7/16* (2006.01)
*H02K 41/03* (2006.01)
(Continued)

(52) U.S. Cl.
CPC ............. *H01F 7/1615* (2013.01); *H02K 5/02* (2013.01); *H02K 11/0141* (2020.08);
(Continued)

(58) Field of Classification Search
CPC .... H01F 7/1615; H02K 11/0141; H02K 5/02; H02K 41/031
See application file for complete search history.

(56) References Cited

U.S. PATENT DOCUMENTS

| 2004/0051607 | A1* | 3/2004 | Rausch | H01F 7/066 335/220 |
| 2015/0102878 | A1* | 4/2015 | Shin | H01F 7/066 335/279 |
| 2022/0094252 | A1* | 3/2022 | Kim | H02K 33/06 |

FOREIGN PATENT DOCUMENTS

| JP | 60-236201 A | 11/1985 |
| JP | 09-503379 A | 3/1997 |

(Continued)

OTHER PUBLICATIONS

Machine translation of Ji [KR 10-2005-0047671] (Year: 2005).*
Machine translation of Hyundai [KR10-1552573 B1] (Year: 2015).*

*Primary Examiner* — Bernard Rojas
(74) *Attorney, Agent, or Firm* — NKL Law; Jae Youn Kim (57) ABSTRACT

An actuator is proposed. A housing and a housing cap may constitute the exterior of the actuator, and a driving pin may be installed in an inner space of the housing such that the driving pin is moved by being guided by a guide. A cylindrical bobbin having one open end portion may be installed at the driving pin to be moved integrally therewith, and a coil may be installed at the bobbin. A permanent magnet and an iron core may be stacked in the inner space by the guide. A pin iron core may be provided at the driving pin, and a pin coil may be installed in a groove of the pin iron core.

6 Claims, 5 Drawing Sheets

(51) Int. Cl.
  *H02K 5/02* (2006.01)
  *H02K 11/01* (2016.01)
(52) U.S. Cl.
  CPC ... *H02K 41/031* (2013.01); *H01F 2007/1692* (2013.01); *H02K 2203/12* (2013.01)

(56) References Cited

FOREIGN PATENT DOCUMENTS

| | | |
|---|---|---|
| JP | 10-080121 A | 3/1998 |
| JP | 2017-005872 A | 1/2017 |
| KR | 10-2003-0064410 A | 7/2003 |
| KR | 10-2005-0047671 A | 5/2005 |
| KR | 10-1512838 B1 | 4/2015 |
| KR | 10-1552573 B1 | 9/2015 |

\* cited by examiner

MOVING COIL TYPE ACTUATOR

TECHNICAL FIELD

The present disclosure relates generally to an actuator. More particularly, the present disclosure relates to an actuator in which a rectilinear movement of a driving pin is performed by using a permanent magnet and a coil.

BACKGROUND ART

In actuators, there is a type of actuator which uses a voice coil to drive a driving pin. The actuator using the voice coil is driven in a principle in which force (Lorentz force) is generated in a conducting wire when electric current flows through the conducting wire in a magnetic field.

That is, when the strength of the magnetic field is B, electric current flowing in the conducting wire is i, and the entire length of the conducting wire inside the magnetic field is L, force F generated in the conducting wire is expressed by the following equation.

$$F=BiL\ (N)$$

Here, the force generated in the conducting wire is directed perpendicularly to electric current flowing in the magnetic field and the conducting wire. The direction of the force can be explained by Fleming's left hand rule, and the force is proportional to the winding number n of a coil and thus may be expressed by the following equation.

$$F=nBiL\ (N)$$

As can be seen from this equation, a force generated in the conducting wire, that is, force for driving a pin is proportional to electric current i, a winding number n, and length L of a conducting wire.

Accordingly, to increase force for driving the pin when designing the actuator, the electric current i, the winding number n, and the length L of the conducting wire are required to be increased. In this case, there occurs a problem that the size of the actuator is increased.

Disclosure

Technical Problem

The present disclosure has been made keeping in mind the above problems occurring in the prior art, and the present disclosure is intended to propose an actuator in which a permanent magnet and a coil which are used may be efficiently arranged to maximize the generation of a thrust.

In addition, the present disclosure is intended to propose an actuator in which the coil may be provided at each of a driving pin and a bobbin moving together and the permanent magnet may be provided between these coils such that magnetism of the permanent magnet is more efficiently used.

Technical Solution

In order to accomplish the above objectives, according to an aspect of the present disclosure, an actuator of present disclosure includes: a housing having an inner space defined therein; a driving pin installed at a center of the housing by passing therethrough such that the driving pin moves rectilinearly; a bobbin installed at the driving pin and moving integrally with the driving pin when the driving pin moves; a coil installed at the bobbin and moving integrally with the bobbin; a pin coil installed at the driving pin and moving integrally with the driving pin; a permanent magnet installed in the inner space of the housing and generating magnetism; and an iron core allowing a flow path of a magnetic flux coming from the permanent magnet to be formed, wherein the iron core is installed in the inner space such that the iron core faces each of the coil installed at the bobbin and the pin coil installed at the driving pin by being spaced apart by a predetermined distance therefrom.

A guide may be installed through a center of the housing, and the driving pin may be installed by passing through the guide such that a rectilinear movement of the driving pin is guided.

The housing may be made of the same material as a material of the iron core and together with the iron core, may allow the flow path of the magnetic flux to be formed.

The pin coil may be installed in a groove formed in a pin iron core located at the driving pin.

A housing cap may be installed at an end part of the housing so as to shield the inner space from outside.

A washer may be installed at the driving pin protruding to the outside of the housing cap, and an elastic member may be installed between the washer and the housing cap such that the elastic member supplies an elastic restoring force to the driving pin when an electric current is not applied to the coil and the pin coil.

The magnetic flux generated from the permanent magnet located at each of opposite sides of the iron core may pass through each of the coil facing the iron core and installed at the bobbin and the pin coil installed at the driving pin.

In the iron core and the permanent magnet, a set of permanent magnet and iron core in which the permanent magnet is provided at each of opposite sides of the iron core located in the inner space may be repeatedly installed, and an iron core may be located at each of opposite end parts at which the iron cores and permanent magnets are arranged.

One of the iron cores of the opposite end parts at which the iron cores and the permanent magnets are arranged may be an end part of the housing.

Advantageous Effects

An actuator according to the present disclosure may obtain the following effects.

In the present disclosure, a permanent magnet may be installed at each of the opposite sides of one iron core, and the coil may be installed to face the iron core such that two magnetic paths are simultaneously formed in the coil so as to increase the strength of the magnetic field, thereby increasing force acting on the coil and increasing a thrust by which a driving pin is operated.

In the present disclosure, the coil may be installed at each of the opposite sides of the permanent magnet, and magnetism generated in one permanent magnet may pass through a pin coil located in the driving pin corresponding to the center of a bobbin and through the coil installed in the bobbin, thereby generating a relatively large thrust and distributing a magnetic flux toward the pin coil and the coil installed in the bobbin without being concentrated on one side such that the saturation of the magnetic flux is prevented.

MODE FOR INVENTION

Hereinafter, an embodiment of the present disclosure will be described in detail with reference to the accompanying drawings. In giving reference numerals to components of each drawing, it should be noted that the same components are given the same reference numerals as many as possible although they are indicated on different drawings. In addition, in describing the embodiment of the present disclosure, if it is determined that a detailed description of a related known configuration or function interferes with the understanding of the embodiment of the present disclosure, the detailed description thereof will be omitted.

In addition, in describing the components of an actuator of the present disclosure according to the embodiment, terms such as first, second, A, B, (a), (b), etc. may be used. These terms are only for distinguishing the components from other components, and the essence or order of the components are not limited by the terms. When it is described that a component is "connected", "coupled", or "bonded" to another component, it should be understood that the component may be directly connected or bonded to the other component, but another component may be provided between each component to be connected or bonded thereto.

As illustrated in the drawings, the exterior of an actuator of the present disclosure may be constituted by a housing 10. The housing 10 may have an approximate cylindrical shape and may have a cylindrical inner space 12 defined in the housing 10. The inner space 12 of the housing 10 may be shielded by a housing cap 14. In fact, the housing cap 14 may also be considered a part of the housing 10. The housing 10 may be made of the same material as the material of an iron core 26 to be described later, and may allow a flow path of a magnetic flux to be formed therein. The housing cap 14 may be made of the same material as the material of the housing 10, but is not required to be limited thereto. It is preferable that the housing cap 14 is made of a relatively light material such as aluminum or synthetic resin.

A guide 16 may be installed through the center of the housing 10. The guide 16 may guide the movement of a driving pin 18 to be described later. The guide 16 may be cylindrically shaped and thus the driving pin 18 may be installed by passing through the inside of the guide 16. It is recommended that the guide 16 is made of a non-magnetic material. For example, the guide 16 may be made of copper. The guide 16 may be fixed to the housing 10 at an end part thereof.

The driving pin 18 may be installed by passing through the inside of the guide 16. The driving pin 18 may pass through the guide 16, and pass through the housing 10 and the housing cap 14 such that the opposite end parts of the driving pin 18 may protrude to the outside of the housing 10. It is preferable that the driving pin 18 is made of a light material for easy movement. The driving pin 18 may be made of aluminum as an example. The driving pin 18 may perform a rectilinear reciprocating motion by being guided by the guide 16.

A first end part of the driving pin 18 may be connected to a side at which the driving force of the actuator is used. An elastic member 20 may be installed at a second end part of the driving pin 18 and may supply elastic force to the driving pin 18 when the driving pin 18 returns to an initial position after protruding to the outside of the housing 10. A first end part of the elastic member 20 may be supported by the housing 10, more specifically, by the housing cap 14, and a second end part of the elastic member 20 may be supported by a washer 22 installed at the driving pin 18, so the elastic member 20 may supply elastic force to the driving pin 18.

A permanent magnet 24 and the iron core 26 may be installed in the inner space 12 of the housing 10. In the embodiment of the present disclosure, the permanent magnet 24 and the iron core 26 may all be configured to have ring shapes. The permanent magnet 24 and the iron core 26 may be fixed by the fixing of the guide 16 to the housing 10. The arrangement of the permanent magnet 24 and the iron core 26 may be related to the positions of the coil 30 and a pin coil 32 to be described later.

In the embodiment of the present disclosure, the iron core 26 and the permanent magnet 24 may be installed in the following manner. Two permanent magnets 24 may be stacked approximately at a middle of the guide 16 in a longitudinal direction thereof, and an iron core 26 and a permanent magnet 24 may be sequentially positioned at the upper and lower sides, respectively, of the two stacked permanent magnets 24. An iron core 26 may be located at the top and bottom relative to the drawing. In the embodiment of the present disclosure, the housing 10 may also be made of the same material as the material of the iron core 26, and a part of the housing 10 of the lowest part relative to the drawing may function as the iron core 26. That is, the housing 10 may also function as a path of the magnetic flux. To this end, an end part of the housing 10 may be approximately slightly thicker than the iron core 26.

Figure 1:
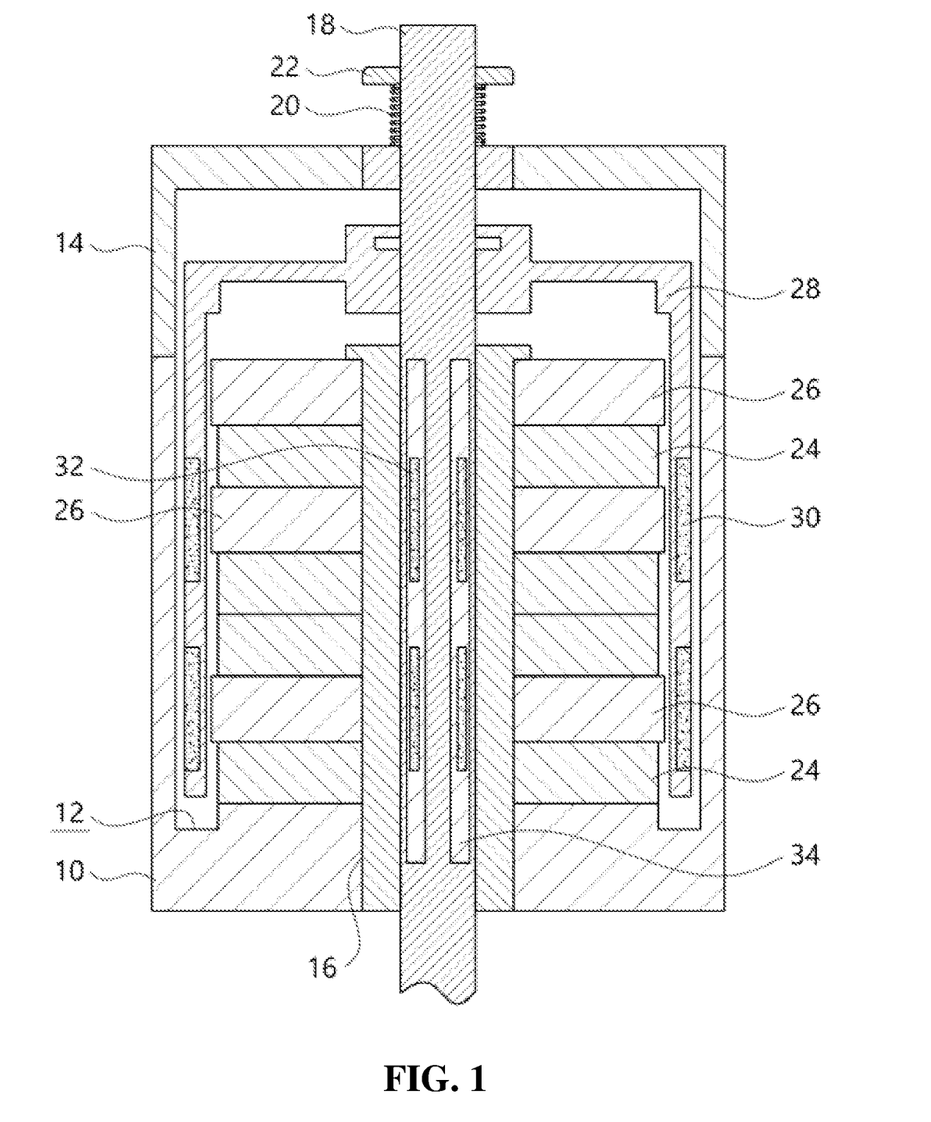
FIG. 1 is a sectional view illustrating configuration of an actuator according to an exemplary embodiment of the present disclosure.

A bobbin 28 may be installed at the driving pin 18. The bobbin 28 may have an open cylindrical shape at an end part thereof. It is preferable that the bobbin 28 is also made of a material as light as possible. The bobbin 28 may be made of synthetic resin. The coil 30 may be installed at the bobbin 28 such that the coil 30 is located at a position adjacent to the iron core 26 to face the iron core 26. The coil 30 may be installed by surrounding the outer or inner circumferential surface of the bobbin 28. The outer shape of the coil 30 may be approximately ring-shaped. In the embodiment of the present disclosure, the coil 30 includes two coils 30, but is not limited thereto. At least one coil 30 may be located at a position corresponding to the iron core 26. The coil 30 may be installed such that a center portion of the coil 30 faces a center portion of the iron core 26 relative to the drawing. That is, the iron core 26 facing the coil 30 may have at least the same size as the size of the coil 30 in a height direction relative to FIG. 1 such that the magnetic flux transmitted through the iron core 26 passes through the entirety of the coil 30. Of course, the coil 30 may have a size larger than the size of the iron core 26.

Figure 2:
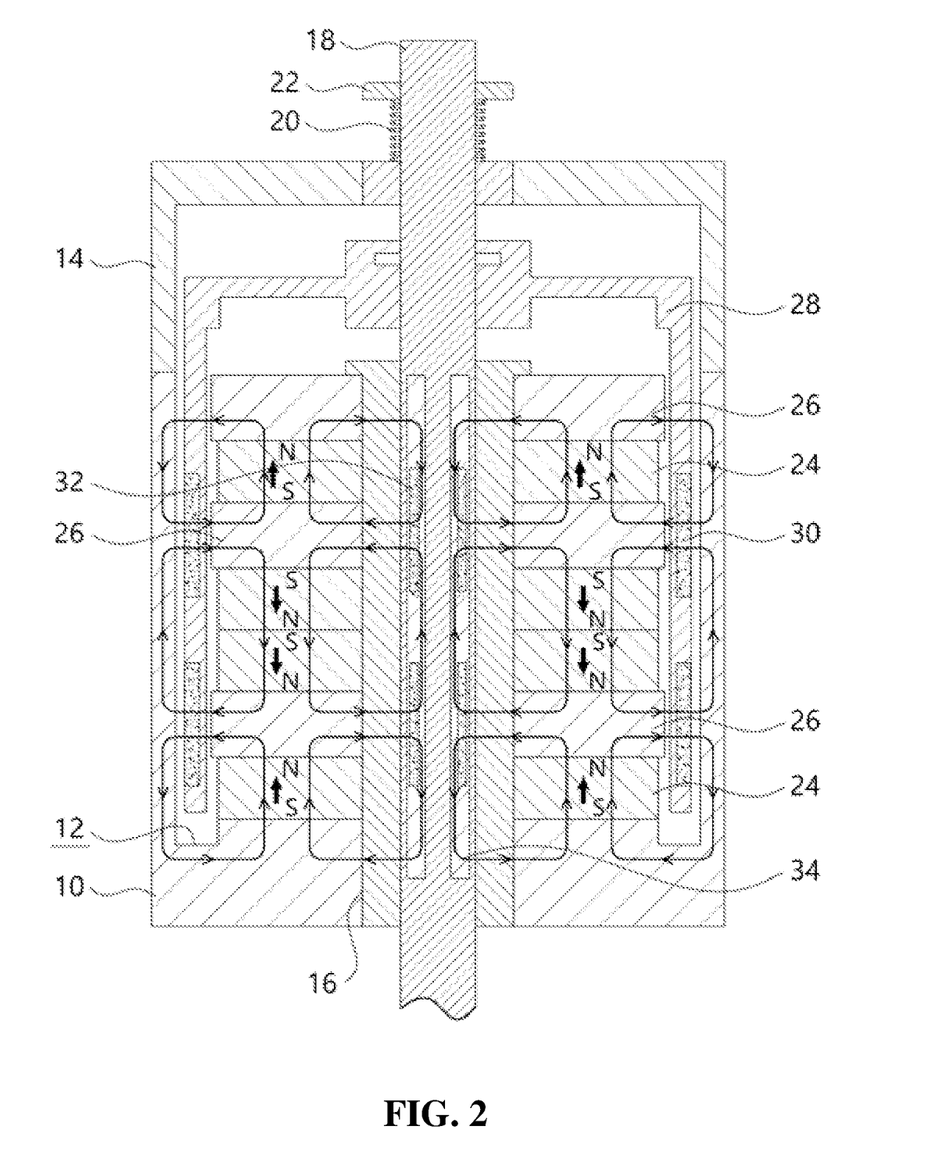
FIG. 2 is a sectional view illustrating a relation between a permanent magnet and a coil constituting the actuator according to the embodiment of the present disclosure.

Accordingly, the coil 30 may be located at a position corresponding to the iron core 26 to make a path in which the magnetic flux formed by the permanent magnet 24 passes through the iron core 26, through the coil 30, through the housing 10 functioning as the iron core, through an iron core 26, and flows back to the permanent magnet 24. Such a path is illustrated in FIG. 2.

Particularly, in the present disclosure, two magnetic paths may be formed in the iron core 26 located between the permanent magnets 24 such that the amount of the magnetic flux passing through the coil 30 is relatively increased.

Meanwhile, the pin coil 32 may be installed by surrounding the outer circumferential surface of the driving pin 18. The pin coil 32 may also be made to have a ring shape. The pin coil 32 installed on the driving pin 18 may be installed at a position corresponding to the position of the coil 30 installed at the bobbin 28. This is related to the arrangement of the iron core 26 and the permanent magnet 24. That is, the pin coil 32 may be arranged to face the iron core 26 located between the permanent magnets 24 in the same manner in which the iron core 26 located between the permanent magnets 24 is arranged to face the coil 30.

A pin iron core 34 may be installed at the driving pin 18 such that the magnetic flux efficiently passes through the pin coil 32 installed at the driving pin 18. The pin iron core 34 may surround the driving pin 18 in a ring shape, and the pin coil 32 may be installed in a groove formed in the pin iron core 34. The pin iron core 34 may allow the flow path of the magnetic flux to be formed therein such that the magnetic flux efficiently passes through the pin coil 32.

Hereinafter, the use of the actuator having the configuration described above according to the present disclosure will be described.

Figure 4:
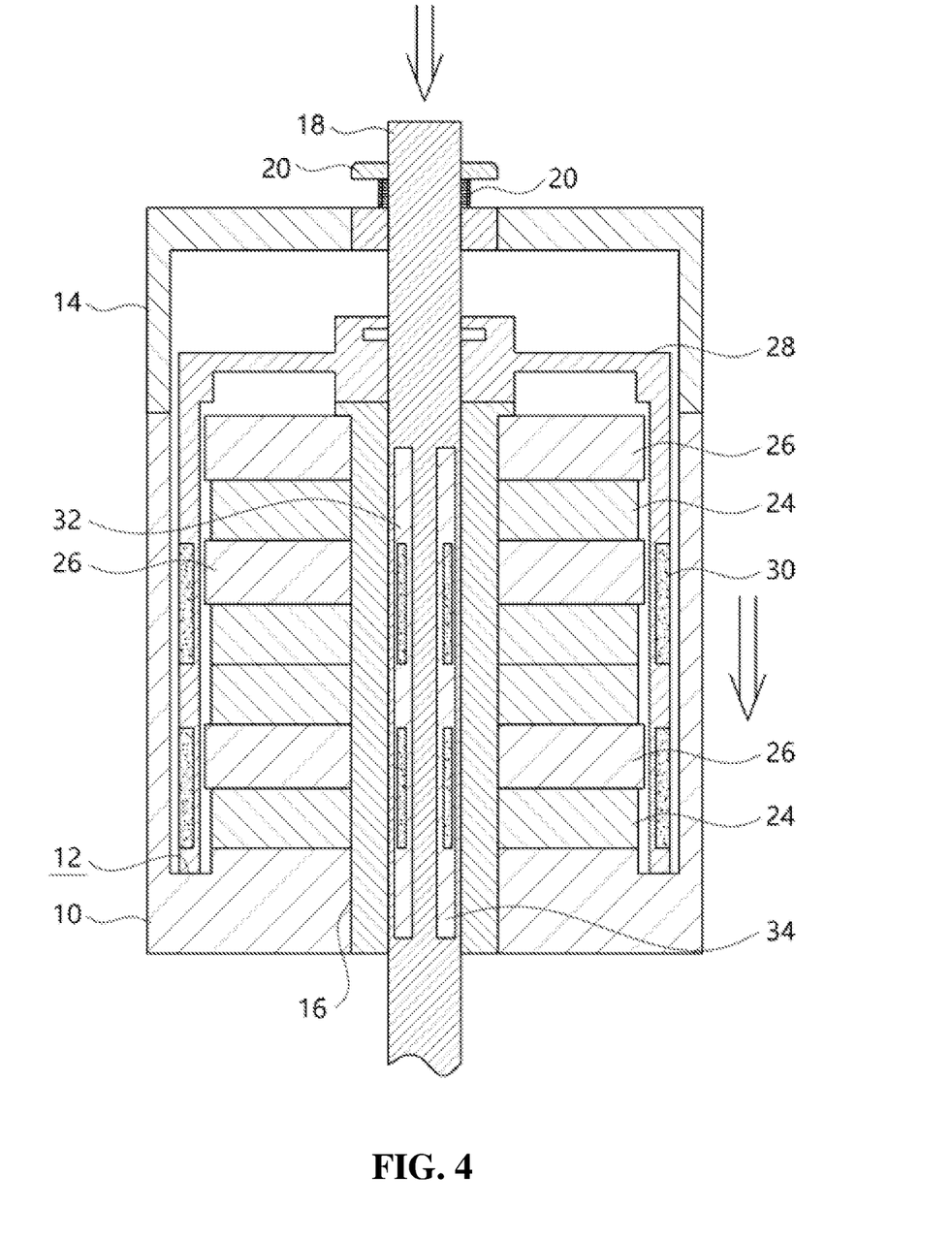
FIG. 4 is a sectional view illustrating a state of the driving pin protruding from a housing in the embodiment of the present disclosure.
Figure 5:
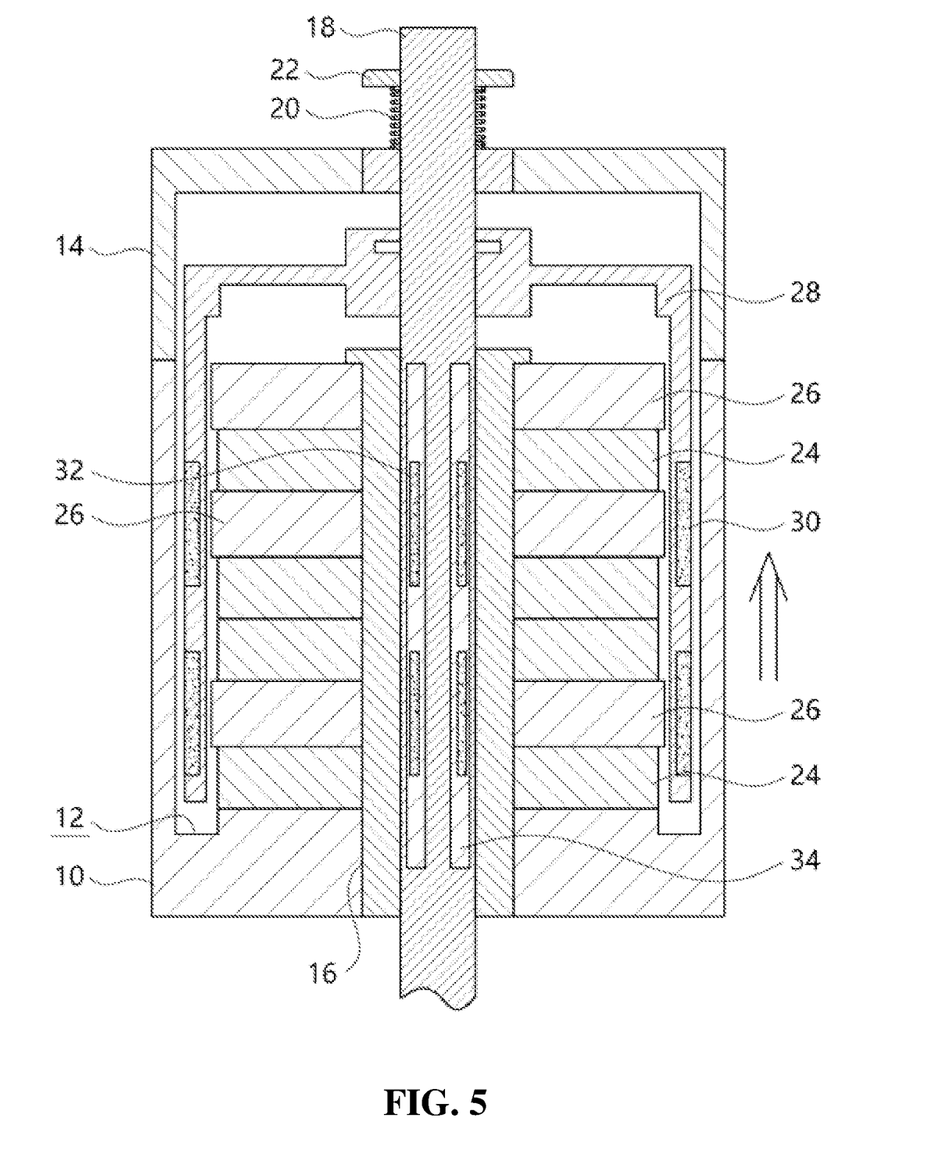
FIG. 5 is a sectional view illustrating a state in which the driving pin is received in the housing in the embodiment of the present disclosure.

In the present disclosure, a force of moving the coil 30 and the pin coil 32 in the magnetic field according to Fleming's left hand rule may be generated by causing an electric current to flow through the coil 30 and the pin coil 32 such that the driving pin 18 is moved. That is, the driving pin 18 may protrude a predetermined length further outward from the housing 10. Such a state is illustrated in FIG. 4, and a state in which the driving pin 18 is moved to an initial position is illustrated in FIG. 5.

In addition, when the electric current applied to the coil 30 and the pin coil 32 is removed, the driving pin 18 may be moved to an initial position by the restoring force of the elastic member 20. By performing such an operation, the actuator causes a desired part to be driven.

Figure 3:
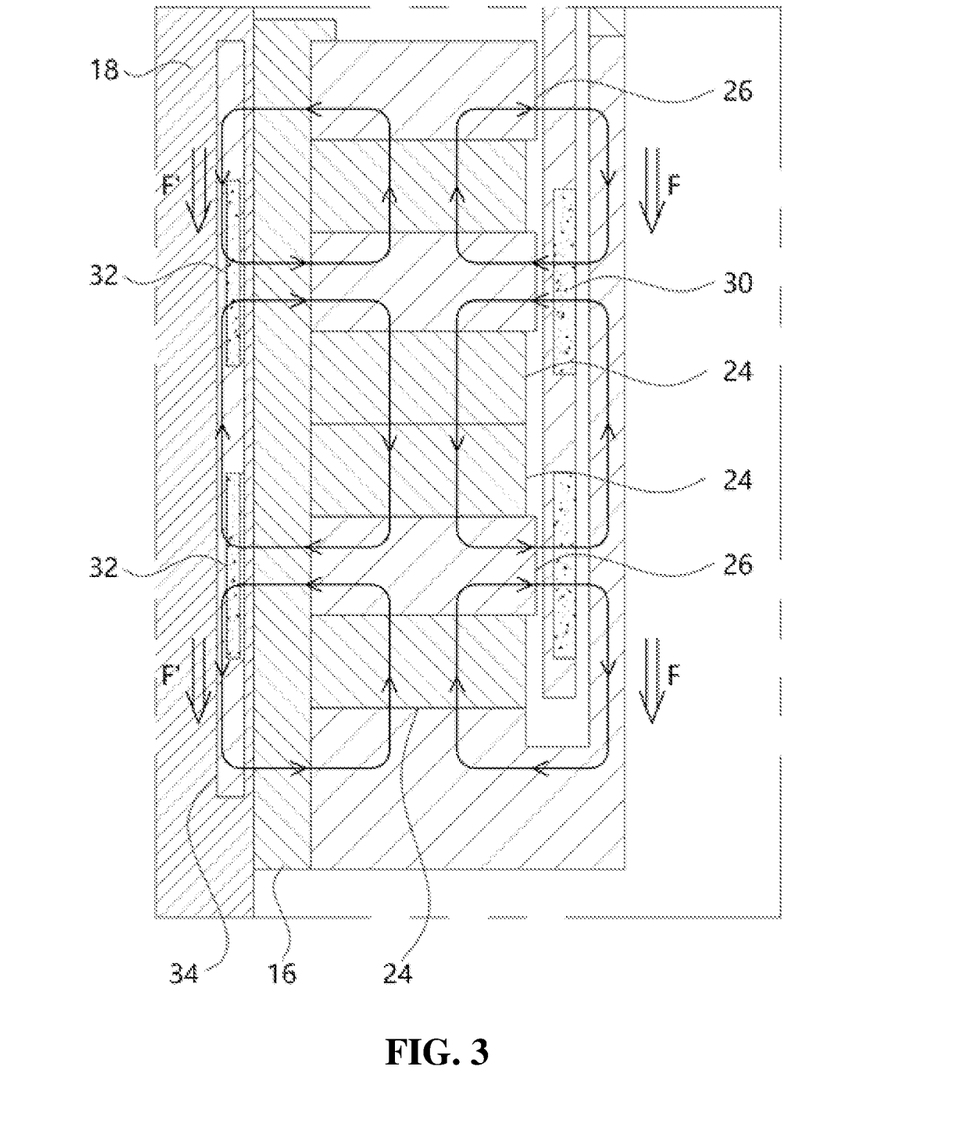
FIG. 3 is a sectional view illustrating the operation of a driving pin in the embodiment of the present disclosure.

Referring to FIGS. 2 and 3, an operation in which the driving pin 18 is moved will be described. In the illustrated embodiment, the magnetic field may be formed by magnetism of the permanent magnet 24, and the magnetic flux may flow in the magnetic field so as to form a closed curve as indicated by a solid arrow. The permanent magnet 24 may generate a magnetic flux in a direction indicated by a bold arrow in FIG. 3 according to the direction of a polarity thereof.

Accordingly, as illustrated in FIG. 3, due to each of the permanent magnets 24, a magnetic flux may flow through magnetic paths marked with rectangles. A magnetic path at the uppermost part relative to FIG. 3 may be formed in a clockwise direction. That is, the magnetic path may be formed such that a magnetic flux flows from the permanent magnet 24, through the iron core 26, the housing 10 functioning as the iron core, the coil 30, and the iron core 26, and flows to the initial permanent magnet 24.

A magnetic path may be formed in a counterclockwise direction by the second and third permanent magnets from the top such that a magnetic flux flows, and a magnetic path may be formed in a clockwise direction by a permanent magnet 24 located at the lowest side such that a magnetic flux flows. Of course, the direction of the magnetic flux may be reversed depending on how the polarity of the permanent magnet 24 is arranged.

In this state, when an electric current is applied to the coil 30, the force of moving the coil 30 may be generated. An electric current may be applied to the coil 30 located at an upper right side relative to FIG. 3 in a direction of the electric current coming from the ground, and an electric current may be applied to the coil 30 located at a lower part relative to FIG. 3 in a direction of the electric current going into the ground. Accordingly, when the electric currents are applied to the coils 30, forces moving the coils 30 in directions of arrows F may act on the coils 30 and thus the bobbin 28 may be moved, so the driving pin 18 may be moved. This operation may move the bobbin 28 by generating force in the entirety of the bobbin 28 by the permanent magnet 24, the iron core 26, and the coil 30.

Meanwhile, the same operation may occur even in the pin coil 32 installed at the driving pin 18. A magnetic path may be formed by the iron core 26 and the pin iron core 34 such that a magnetic flux passes through the pin coil 32, so the magnetic flux coming from the permanent magnet 24 may move. In this state, when an electric current is applied to the pin coil 32, a force may act on the pin coil 32 according to Fleming's left hand rule as described above, and may act as a force moving the driving pin 18. When the electric current is set to be applied to the pin coil 32 such that a force acts on the pin coil 32 in the same direction as the direction of a force acting on the coil 30, the driving pin 18 may be operated by the force acting on the pin coil 32.

As illustrated in FIG. 3, in the pin coil 32 in the upper left of FIG. 3, a magnetic flux flows in a counterclockwise direction and an electric current is applied in a direction of the electric current going to the ground. Accordingly, the pin coil 32 in the upper left, together with the pin coil 32 in the lower left of FIG. 3, may apply a force F' to the driving pin 18.

Accordingly, when an electric current is applied to the coil 30 and the pin coil 32, the driving pin 18 may be moved, and as illustrated in FIG. 4, the driving pin 18 may protrude relatively to the outside of the housing 10.

In addition, when the electric current applied to the coil 30 and the pin coil 32 is removed, the force according to Fleming's left hand rule may no longer act on the coil 30 and the pin coil 32, and the elastic restoring force of the elastic member 20 may be supplied to the driving pin 18, so as illustrated in FIG. 5, the driving pin 18 may be moved to an initial position.

In the above, even if all the components constituting the actuator according the embodiment of the present disclosure are described as being integrally combined or being operated integrally in combination, the present disclosure is not necessarily limited to this embodiment. That is, within the scope of the objective of the present disclosure, all the components may operate in at least one selective combination. In addition, terms such as "include", "constitute", or "have" described above mean that the corresponding component may be inherent unless otherwise stated. Accordingly, the terms should not be construed as excluding other components, but as being able to further include other components. All terms including technical and scientific terms have the same meaning as commonly understood by those skilled in the art to which the present disclosure belongs, unless otherwise defined. Commonly used terms, such as terms defined in a dictionary, should be interpreted as being consistent with the contextual meaning of the related art, and are not interpreted in an ideal or excessively formal meaning unless explicitly defined in the present disclosure.

The above description is merely illustrative of the technical spirit of the present disclosure, and those skilled in the art to which the present disclosure pertains may make various modifications and variations without departing from the essential characteristics of the present disclosure. Accordingly, the embodiment disclosed in the present disclosure is for explaining rather than limiting the technical spirit of the present disclosure, and the scope of the technical spirit of the present disclosure is not limited to the embodiment. The protection scope of the present disclosure should be interpreted by the following claims, and all technical ideas within the scope equivalent thereto should be construed as being included in the scope of the present disclosure.

In the illustrated embodiment, the housing 10, the inner space 12, the guide 16, the permanent magnet 24, the iron core 26, the bobbin 28 may be described to have cylindrical shapes or ring shapes, but may not be limited thereto.

For example, the exterior of the housing 10 may not be circular, but may be hexahedral, and the inside of the guide 16 may also have a polygonal cross-section instead of a circular one.

The invention claimed is:

1. A moving coil type actuator comprising:
   a housing having an inner space defined therein;
   a driving pin installed at a center of the housing by passing therethrough such that the driving pin moves rectilinearly;
   a guide installed through the center of the housing, and the driving pin is installed by passing through the guide such that a rectilinear movement of the driving pin is guided,
   a bobbin installed at the driving pin and moving integrally with the driving pin when the driving pin moves;
   a coil installed at the bobbin and moving integrally with the bobbin;
   a pin coil installed at the driving pin and moving integrally with the driving pin;
   a permanent magnet installed in the inner space of the housing and generating magnetism; and
   an iron core allowing a flow path of a magnetic flux coming from the permanent magnet to be formed, wherein the iron core is installed in the inner space such that the iron core faces each of the coil installed at the bobbin and the pin coil installed at the driving pin by being spaced apart by a predetermined distance therefrom,
   wherein, the housing is made of the same material as a material of the iron core and together with the iron core, allows the flow path of the magnetic flux to be formed, and
   wherein, the pin coil is installed in a groove formed in a pin iron core located at the driving pin.

2. The moving coil type actuator of claim 1, wherein a housing cap is installed at an end part of the housing so as to shield the inner space from outside.

3. The moving coil type actuator of claim 2, wherein a washer is installed at the driving pin protruding to the outside of the housing cap, and an elastic member is installed between the washer and the housing cap such that the elastic member supplies an elastic restoring force to the driving pin when an electric current is not applied to the coil and the pin coil.

4. The moving coil type actuator of claim 1, wherein the magnetic flux generated from the permanent magnet located at each of opposite sides of the iron core passes through each of the coil facing the iron core and installed at the bobbin and the pin coil installed at the driving pin.

5. The moving coil type actuator of claim 4, wherein the iron core and the permanent magnet are arranged as a set of permanent magnets and iron cores in which the permanent magnets are provided at each of opposite sides of the iron cores located in the inner space is repeatedly installed, and the iron cores are located at each of opposite end parts at which the iron cores and permanent magnets are arranged.

6. The moving coil type actuator of claim 5, wherein one of the iron cores of the opposite end parts at which the iron cores and the permanent magnets are arranged is an end part of the housing.

* * * * *